US012320902B2

(12) United States Patent
Clausen et al.

(10) Patent No.: US 12,320,902 B2
(45) Date of Patent: Jun. 3, 2025

(54) SPOOFING DETECTION FOR VEHICLE-BASED GNSS RECEIVERS

(71) Applicant: u-blox AG, Thalwil (CH)

(72) Inventors: Philipp Clausen, Thalwil (CH); Alexander Somieski, Thalwil (CH)

(73) Assignee: u-blox AG, Thalwil (CH)

( * ) Notice: Subject to any disclaimer, the term of this patent is extended or adjusted under 35 U.S.C. 154(b) by 351 days.

(21) Appl. No.: 17/704,402

(22) Filed: Mar. 25, 2022

(65) Prior Publication Data

US 2022/0308237 A1  Sep. 29, 2022

(30) Foreign Application Priority Data

Mar. 26, 2021 (EP) ..................................... 21165363

(51) Int. Cl.
G01S 19/21 (2010.01)
G01S 19/49 (2010.01)

(52) U.S. Cl.
CPC ............ *G01S 19/215* (2013.01); *G01S 19/49* (2013.01)

(58) Field of Classification Search
CPC .......................... G01S 19/21–215; G01S 19/49
See application file for complete search history.

(56) References Cited

U.S. PATENT DOCUMENTS

| | | | |
|---|---|---|---|
| 8,694,248 B1 * | 4/2014 | Arbuckle | G01C 21/28 702/69 |
| 11,002,858 B2 * | 5/2021 | Broumandan | G01S 19/215 |
| 2017/0070971 A1 * | 3/2017 | Wietfeldt | H04W 24/10 |
| 2019/0187294 A1 * | 6/2019 | Khalajmehrabadi | G01S 19/215 |
| 2022/0252734 A1 * | 8/2022 | Odeh | H04K 3/90 |

OTHER PUBLICATIONS

EP Extended Search Report in European Appln. No. 21165363.9, dated Sep. 23, 2021, 9 pages.
Lo et al., "The Benefit of Low Cost Accelerometers for GNSS Anti-Spoofing," Proceedings of the ION Pacific PNT 2017 Conference, 2017, pp. 775-796.
Niedermeier et al., "Detection and mitigation of GNSS deception by combination of odometric dead reckoning and GNSS observations for vehicles," Proceedings of the 23rd International Technical Meeting of The Satellite Division of the Institute of Navigation (ION GNSS 2010), 2010, pp. 1145-1156.
Qiao et al., "A vision-based GPS-spoofing detection method for small UAVs," 2017 13th International Conference on Computational Intelligence and Security, IEEE, 2017, pp. 312-316.
Wei et al., "Integrity Analysis and Comparison of GNSS/INS Integrated Navigation System with/without NHC under GNSS Spoofing Attacks," Proceedings of the 32nd International Technical Meeting of the Satellite Division of The Institute of Navigation (ION GNSS+ 2019), 2019, pp. 3113-3122.

* cited by examiner

*Primary Examiner* — Cassi J Galt
(74) *Attorney, Agent, or Firm* — Fish & Richardson P.C.

(57) ABSTRACT

A method and apparatus are provided for spoofing detection in the context of a vehicle-based GNSS receiver. An attitude estimate of the vehicle is obtained. A velocity estimate is calculated based on measurements provided by the GNSS receiver. The method comprises projecting the velocity estimate to a body frame of the vehicle, using the attitude estimate; deriving a detection parameter from the projected velocity estimate; and comparing the detection parameter with a detection threshold, in order to detect spoofing.

16 Claims, 8 Drawing Sheets

SPOOFING DETECTION FOR VEHICLE-BASED GNSS RECEIVERS

FIELD OF THE INVENTION

The present invention relates to Global Navigation Satellite Systems. More particularly, it relates to spoofing detection in the context of a Global Navigation Satellite System (GNSS).

BACKGROUND OF THE INVENTION

Methods of calculating positions and velocities of vehicles using Global Navigation Satellite Systems (GNSSs), such as the Global Positioning System (GPS), are known. Traditionally, the calculation of position relies on multilateration, based on the time it takes signals to arrive at a receiver from at least four different satellites. The information received from the satellites enables the receiver to calculate the positions of several satellites, and thereby calculate its own position relative to the satellites via multilateration.

Calculating the position/velocity of the vehicle over multiple epochs (that is, multiple measurement-intervals of a GNSS receiver) allows the vehicle to be tracked. The accuracy of such tracking has increasing commercial relevance, as self-driving vehicles rely on the information characterising the surrounding environment, gathered by a GNSS receiver and other sensors, to allow the vehicle to navigate transport networks without any human input. Developing increasingly accurate positioning is not only beneficial to navigation systems. For example, toll tags require precise vehicle position/velocity data, so that a vehicle with a toll tag on board can be correctly charged when travelling on a toll road.

In particular, it would be desirable for the GNSS receiver to avoid using incorrect signals to calculate the vehicle position. Spoofing attacks that result in inaccurate position estimates are a known problem. In these attacks, "fake" GNSS signals are broadcast by an attacker, in a deliberate attempt to mislead the GNSS receiver. The fake signals have the structure and information content expected of GNSS signals; therefore, the GNSS receiver is liable to accept them as valid GNSS signals. However, the content of the signals is intentionally constructed so that it results in a different (false) position fix. The attack succeeds if the GNSS receiver treats the fake signals as legitimate, and uses them to compute its position/velocity.

Spoofing attacks that are able to successfully target vehicle-based GNSS receivers can significantly affect the reliability of systems that require accurate position/velocity measurements. For example, autonomous vehicles using a navigation system could be at risk of travelling at the wrong speed or—for road-based vehicles—leaving the carriageway, which would pose a serious safety risk to the occupants of the vehicle and those in the surrounding area. Toll tags could be rendered ineffective, with false positioning data causing the vehicle to appear as if it has bypassed the toll, or conversely to be charged incorrectly when not on a toll road.

Some spoofing detection systems are already in place to prevent these attacks from affecting the positioning accuracy provided by vehicle-based GNSS receivers. Typically, extra inputs such as wheel tick signals and steering wheel angles provide reference data, potentially using a controller area network (CAN) vehicle bus interface. These additional inputs are compared with the measurements derived from GNSS signals. If the reconstructed vehicle movement from the reference data deviates significantly from the calculated GNSS measurements, a spoofing attack is detected.

However, adding additional sensors may add cost and complexity, and managing the communications between the vehicle sensors and the GNSS receiver may require greater integration of the GNSS receiver with other in-vehicle systems.

SUMMARY OF THE INVENTION

It would be desirable to provide a spoofing detection method that does not necessarily depend on vehicle-sensors that are external to the GNSS receiver module, such as steering sensors or wheel-tick sensors. This may be particularly beneficial for a standalone GNSS receiver that is not integrated with other vehicle systems, such as a standalone toll-tag.

The invention is defined by the claims. According to a first aspect, there is provided a method of detecting GNSS spoofing, for a GNSS receiver in a vehicle, the method comprising:

obtaining an attitude estimate of the vehicle;

calculating a velocity estimate based on measurements provided by the GNSS receiver;

projecting the velocity estimate to a body frame of the vehicle, using the attitude estimate;

deriving a detection parameter from the projected velocity estimate; and comparing the detection parameter with a detection threshold, in order to detect spoofing.

The inventors have recognised that it is possible to detect spoofing based on a velocity estimate provided by a GNSS receiver, if an estimate of the attitude of the vehicle is available. (The "attitude" refers to the 3-D orientation of the vehicle relative to the frame of reference of the GNSS measurements.) The method projects the velocity estimate to the local reference frame of the vehicle (the "body frame"), using the attitude estimate. The inventors have found that this can allow spoofing to be detected with less dependence on vehicle-integrated sensors, such as those monitoring steering inputs and wheel-ticks. The attitude can be obtained using information from a wide variety of possible sources, including (but not limited to) sensors that may be integrated easily into a GNSS receiver module. In some embodiments, the attitude may be obtained based on sensors integrated in a GNSS receiver module. In some embodiments, the attitude may be obtained based on sensors external to a GNSS receiver module—for example, vehicle-integrated sensors.

The detection parameter is derived from the projected velocity estimate. One or more non-holonomic constraints can provide expected values for the detection parameter. That is, the detection parameter may be designed to be analysed with reference to constraints on the motion of the vehicle during normal use. For example, for a land-based vehicle, such as a wheeled vehicle, the detection parameter may take into account the expectation that, during normal travel, the vehicle does not move laterally (sideways), in the body frame of the vehicle, and/or the expectation that the vehicle does not move vertically, in the body frame of the vehicle.

The measurements provided by the GNSS receiver may comprise position and velocity measurements.

The velocity estimate may be calculated using a least squares estimator.

Spoofing may be detected if the detection parameter exceeds the detection threshold.

The detection parameter may be based on one or both of: a lateral component of the projected velocity estimate; and a vertical component of the projected velocity estimate.

In particular, the detection parameter may comprise a weighted sum of these two components. The lateral component would indicate sideways movement (slipping/drifting). The vertical component would indicate the vehicle leaving the ground (jumping/flying).

The method may further comprise: calculating a velocity uncertainty estimate; projecting the velocity uncertainty estimate to the body frame of the vehicle, using the attitude estimate; and deriving the detection threshold from the projected velocity uncertainty estimate.

The velocity uncertainty estimate may be calculated using a least squares estimator. In particular, it may be calculated using the same least squares estimator as the velocity estimate (however, it may be calculated using a separate filter). This can facilitate the generation of a dynamic detection threshold, which adapts to the prevailing conditions and information available. The detection threshold may be set in direct relation to the projected velocity uncertainty estimate. That is, when the uncertainty is high, the threshold may be high; when the uncertainty is low, the threshold may be low. This can help to minimise false positive detections of spoofing, when there is a large uncertainty in the velocity, and can help to minimise false negatives (missed detections of spoofing) when there is a small uncertainty in the velocity.

The velocity uncertainty estimate may be calculated based on measurements provided by the GNSS receiver.

The detection threshold may be based on one or both of: a lateral component of the projected velocity uncertainty estimate; and a vertical component of the projected velocity uncertainty estimate.

In particular, the detection threshold may comprise a weighted sum of these two components. The detection threshold may be selected by scaling the weighted sum by a configurable sensitivity factor. The method may further comprise, when projecting the velocity estimate and/or the velocity uncertainty estimate to the body frame of the vehicle, compensating for a position of an antenna of the GNSS receiver on the vehicle.

It is beneficial to correct for "lever arm" in this way, in particular for a large vehicle such as a bus, coach, or articulated lorry. This may be particularly important if the attitude estimate is based on inertial measurements, and the inertial measurement unit is located in a different part of the vehicle from an antenna of the GNSS receiver.

The attitude estimate may be based at least in part on inertial measurements.

Inertial measurements could be provided by accelerometers and/or gyroscopes, for example.

The attitude estimate may be provided by a navigation filter.

The navigation filter may generate a position estimate, a velocity estimate, and the attitude estimate, based at least in part on (i) measurements provided by the GNSS receiver and (ii) inertial measurements.

The navigation filter may comprise an extended Kalman filter. The measurements provided by the GNSS receiver may comprise raw measurements (such as pseudoranges and/or Doppler estimates) or navigation data (such as position and/or velocity estimates) derived from the raw measurements.

The method may further comprise performing one or more checks in each epoch, and, if any of the checks is failed, skipping the detection of spoofing for that epoch, wherein the one or more checks may comprise one or more of: checking the quality and number of GNSS signals received at the GNSS receiver; checking the distribution of GNSS space vehicles transmitting the GNSS signals; checking the validity of the attitude estimate; and checking that the velocity estimate is above a minimum threshold.

Here, an epoch is defined as the interval between position/velocity updates of the GNSS receiver.

The minimum threshold for the velocity estimate may be 1 m/s, for example.

If the attitude estimate is provided by a navigation filter, checking the validity of the attitude estimate may comprise checking that all parameters of the navigation solution have been estimated by the navigation filter to a certain quality. For each state estimated by the navigation filter, the navigation filter may also produce an associated uncertainty value. The "quality" of parameter of the navigation solution may be assessed by applying a threshold uncertainty value. If the uncertainty value is below the threshold uncertainty value, then the state of the navigation solution is reasonably certain. For example, if an attitude uncertainty value produced by the EKF is below a threshold attitude uncertainty value, then the attitude estimate is considered to be valid.

Other checks may be performed in each epoch. For example, one further check may determine whether the GNSS signals originate from a specific constellation (for example, selecting only GPS signals, or selecting only Galileo signals), while another check may determine if correction data has been received to compensate for ionospheric and tropospheric propagation delay of the GNSS signals.

Spoofing may be detected if the detection parameter exceeds the detection threshold continuously or continually, for a predetermined period of time.

This can help to reduce false alarms.

Spoofing may be detected if the detection parameter exceeds the detection threshold for a predetermined number of consecutive epochs.

An epoch is the interval between position/velocity updates of the GNSS receiver.

According to another aspect, there is provided a GNSS receiver module for a vehicle, comprising:
  a GNSS receiver; and
  a processor, configured to:
    obtain an attitude estimate of the vehicle;
    calculate a velocity estimate based on measurements provided by the GNSS receiver;
    project the velocity estimate to a body frame of the vehicle, using the attitude estimate;
    derive a detection parameter from the projected velocity estimate; and
    compare the detection parameter with a detection threshold, in order to detect spoofing.

In some instances, the processor may be a part of the GNSS receiver.

The GNSS receiver module may further comprise an inertial measurement unit, the inertial measurement unit comprising sensors configured to generate inertial measurements, wherein the processor may be configured to implement a navigation filter, and wherein the attitude estimate may be generated by the navigation filter, based at least in part on (i) measurements provided by the GNSS receiver and (ii) the inertial measurements.

The sensors may include one or more of:
  at least one accelerometer;
  at least one gyroscope;
  a magnetometer; and a barometer.

The navigation filter may generate a position estimate, a velocity estimate, and the attitude estimate, based at least in part on (i) the measurements provided by the GNSS receiver and (ii) the inertial measurements.

The measurements provided by the GNSS receiver may comprise raw measurements (such as pseudoranges and/or Doppler estimates) or navigation data (such as position and/or velocity estimates) derived from the raw measurements.

The processor may be configured to implement a least squares estimator, wherein the velocity estimate may be calculated using the least squares estimator.

The processor may be further configured to calculate a velocity uncertainty estimate; project the velocity uncertainty estimate to the body frame of the vehicle, using the attitude estimate; and derive the detection threshold from the projected velocity uncertainty estimate.

The velocity uncertainty estimate may be calculated using a least squares estimator. In particular, it may be calculated using the same least squares estimator as the velocity estimate (however, it may be calculated using a separate estimator).

The processor may be further configured to implement any or all of the steps of a method as claimed or as summarised above.

Also provided is a computer program comprising computer program code configured to cause at least one physical computing device to carry out all the steps of a method as summarised above if said computer program is executed by said at least one physical computing device.

The computer program may be embodied on a computer readable medium, optionally a non-transitory computer readable medium. The at least one physical computing device may include or may be a processor of a GNSS receiver.

These and other aspects of the invention will be apparent from and elucidated with reference to the example(s) described hereinafter.

BRIEF DESCRIPTION OF THE DRAWINGS

The invention will now be described by way of example with reference to the accompanying drawings, in which:

FIG. 4A illustrates the case in which the vehicle travels without interference, and FIG. 4B illustrates the case in which the vehicle is subjected to a spoofing attack;

in FIG. 8A where there is no spoofing, and in FIG. 8B where there is spoofing.

Figure 1:
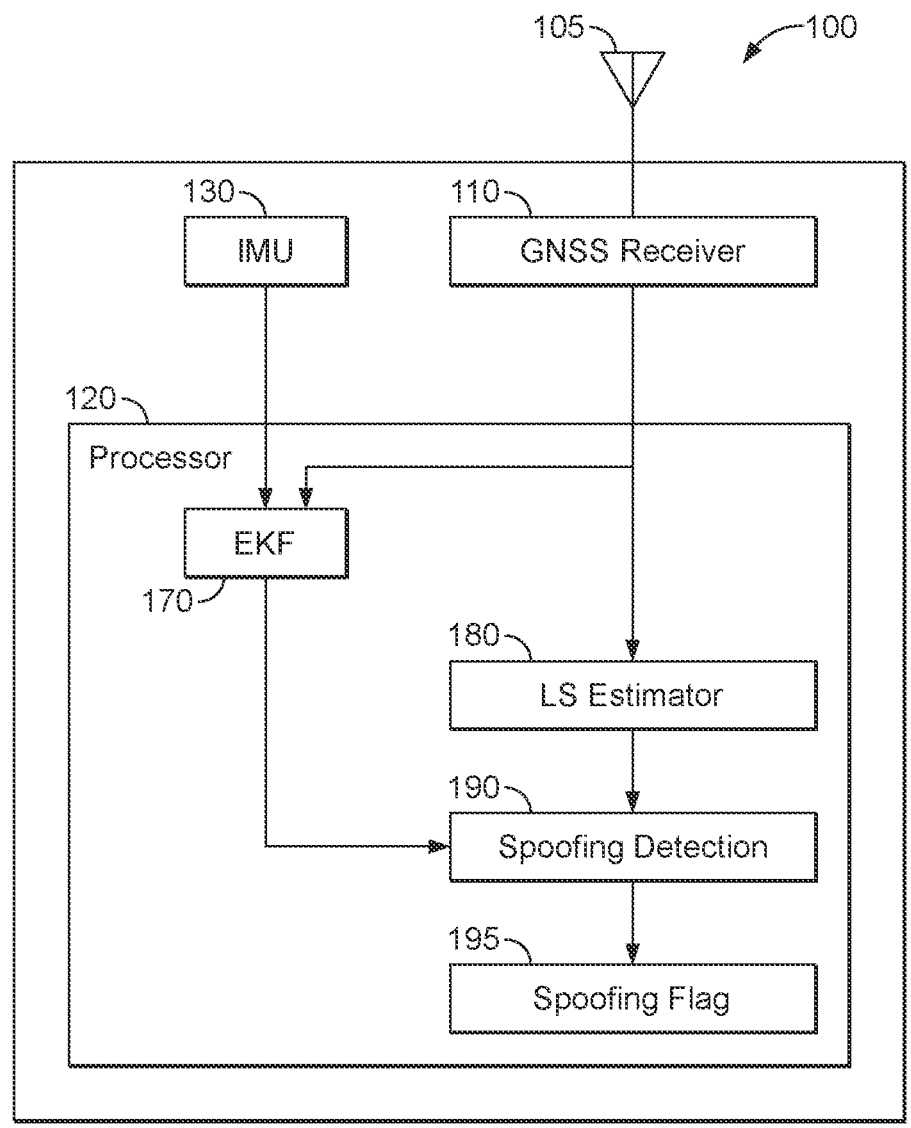
FIG. 1 is a block diagram of a GNSS receiver module for a vehicle according to an example.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms. In the embodiments below, a method for detecting GNSS spoofing for a GNSS receiver in a vehicle, and a GNSS receiver module for a vehicle configured to carry out the method, shall be described.

FIG. 1 shows a block diagram of a GNSS receiver module 100 according to an example. The GNSS receiver module may be used in various vehicle devices, as part of a navigation system, a vehicle tracker, or a toll tag, for example.

As shown in FIG. 1, the GNSS receiver module comprises a GNSS receiver 110, and a processor 120 configured to carry out a method for detecting GNSS spoofing. In some embodiments, the processor may be part of the GNSS receiver, but in the example shown in FIG. 1, it is illustrated as a separate component of the GNSS receiver module 100. The GNSS receiver module is connected to an antenna 105, which is mounted on or in the vehicle. The GNSS receiver module illustrated in FIG. 1 further comprises an inertial measurement unit (IMU) 130 including sensors configured to generate inertial measurements. The IMU may include various possible configurations of sensors in order to generate the inertial measurements. These sensors may include but are not limited to: accelerometers, gyroscopes, a barometer, and a magnetometer. In the present example, there is one accelerometer for each axis of a body reference frame of the vehicle (for example, a Front-Right-Down reference frame) and one gyroscope for each rotational axis (roll, pitch, and yaw) of the vehicle. However, the GNSS receiver module is not limited to such a configuration. The inertial measurements generated by the IMU and the measurements provided by the GNSS receiver are used by the processor to determine whether the vehicle is being subjected to a spoofing attack.

The processor 120 in FIG. 1 is configured to implement a navigation filter—in this example, an extended Kalman filter (EKF) 170—and a least squares (LS) estimator 180. The EKF is designed to estimate variable values, such as attitude, velocity, and position estimates, by using the measurements provided by the GNSS receiver and the inertial measurements. The LS estimator 180 is separate from the navigation filter and is designed to calculate a velocity estimate, using the measurements provided by the GNSS receiver. The LS estimator 180 has no "memory" of the history of measurements or velocity estimates—that is, it does not retain any information from one epoch to the next. Only the measurements provided by the GNSS receiver in the current epoch are used to calculate the velocity estimate. These variables can be used to determine instances of spoofing. The processor 120 is further configured to implement a spoofing detection routine 190, the output of which is a spoofing flag 195. The spoofing flag 195 indicates whether an instance of spoofing has occurred or not.

Figure 2:
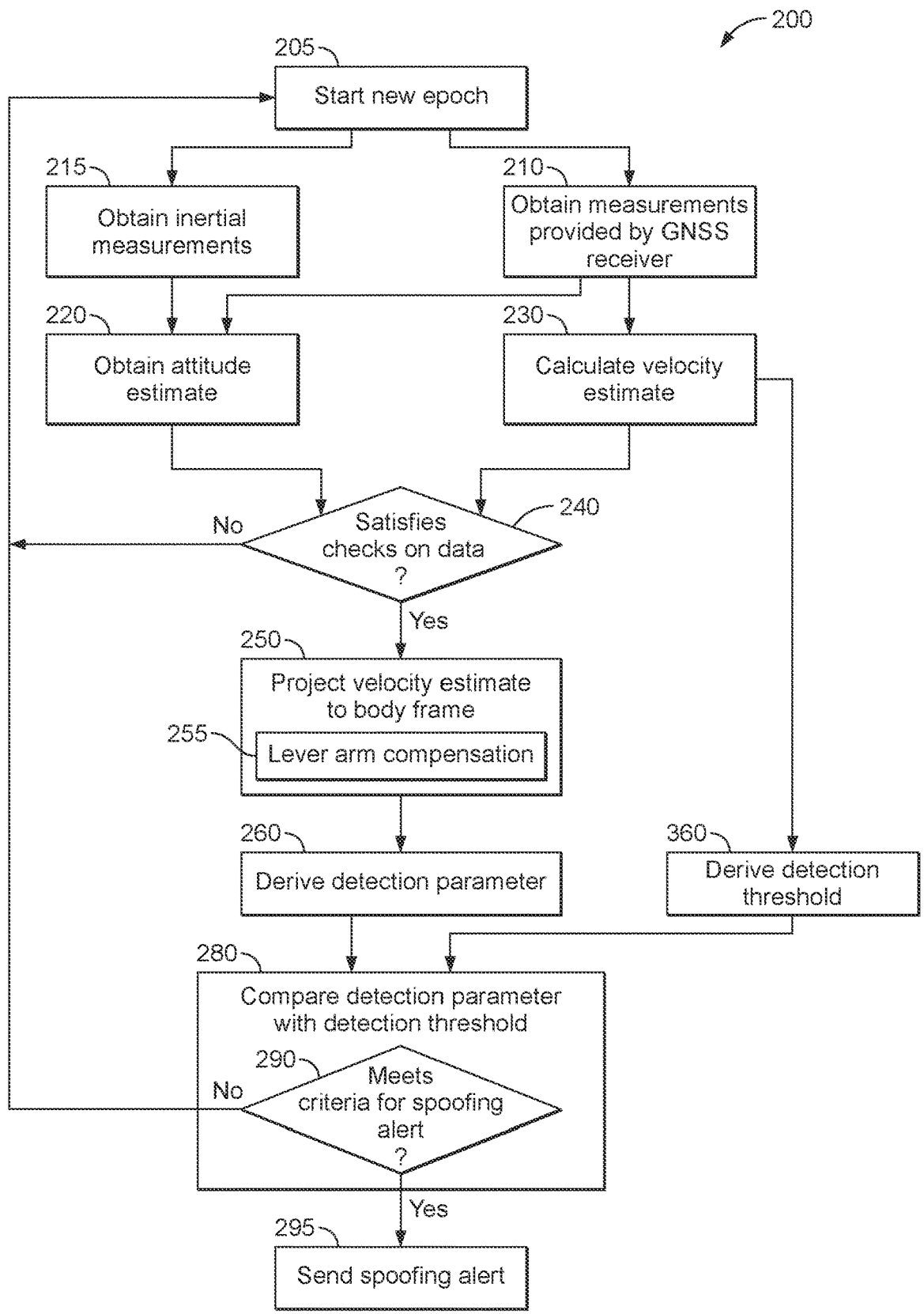
FIG. 2 is a flowchart illustrating a method for detecting GNSS spoofing, for a GNSS receiver in a vehicle.

FIG. 2 illustrates a method to detect GNSS spoofing 200 using the GNSS receiver module 100 of FIG. 1. At the start of each epoch, in step 205, the GNSS spoofing detection method begins a new iteration. In this instance, an epoch is defined as an interval between updates of the GNSS receiver, the updates comprising renewed position and velocity data of the vehicle.

GNSS signals transmitted from GNSS space vehicles (SVs) are received by the GNSS receiver through the antenna 105. The GNSS signals may be received at two or more frequencies in the L band. The GNSS receiver 110 decodes various pieces of information from the GNSS signals. The GNSS receiver 110 calculates the SV coordinates in the current epoch from ephemeris data contained in the GNSS signals. It then calculates pseudoranges between each visible SV and the antenna 105 as well as Doppler shifts for the respective observed SV signals.

In step 210, the processor 120 obtains the measurements from the GNSS receiver 110. In the present example, as explained above, these measurements comprise "raw" GNSS measurements—in particular, pseudoranges and Doppler shifts. This is sometimes known as a "tightly coupled" arrangement. In other examples, a "loosely coupled" arrangement may be used, whereby the GNSS receiver calculates a position and velocity solution, and provides this to the processor. In other words, in the "loosely coupled" arrangement, the measurements received by the processor from the GNSS receiver comprise position and velocity estimates.

In step 215, the processor 120 obtains inertial measurements from the IMU 130. The inertial measurements generated by the IMU allow the GNSS receiver module to derive extra information about the state of the vehicle, such as its attitude—that is, the 3-D orientation of the vehicle relative to the frame of reference of the GNSS measurements obtained in step 210. The local reference frame of the vehicle shall be referred to as the 'body frame', and the reference frame of the GNSS measurements obtained in step 210 shall be referred to as the 'navigation frame'. The navigation frame is considered to be a plane tangent to the Earth's surface at the multilateration position, with axes pointing in the North-East-Down (NED) directions, respectively. The body frame has its axes pointing in the Front-Right-Down (FRD) directions, respectively. It should be understood that these direction conventions are arbitrary; other appropriate variants of local plane coordinate systems can be used.

In step 220, the processor 120 obtains an estimate of the attitude of the vehicle. In particular, the processor calculates the estimate of the attitude, based on the inertial measurements obtained from the IMU 130 and the GNSS measurements. The attitude estimate is generated by the processor using the EKF 170. The EKF is designed to output an attitude estimate by combining current inertial measurements and GNSS measurements with previous attitude estimates. Being able to obtain an accurate attitude estimate is desirable, in order to accurately project variables from the navigation frame to the body frame.

In step 230, the processor 120 calculates a velocity estimate based on the measurements provided by the GNSS receiver. The measurements provided by the GNSS receiver are used to calculate position and velocity estimates of the vehicle in the navigation frame. The velocity estimate of the vehicle can be analysed to detect instances of spoofing, without requiring sensors external to the GNSS receiver module. The velocity estimate is calculated using the LS estimator 180, which is designed to estimate the velocity for the current epoch by minimising the sum of squared errors of the GNSS measurements from the current epoch. Least squares estimation is used because there are more measurements (to SVs) than unknowns (position and velocity). The processor 120 implements the LS estimator independently from the navigation filter. The inputs to the LS estimator 180 are solely the measurements provided by the GNSS receiver 110, so that the velocity estimate in the navigation frame produced by the LS estimator is independent of estimates produced by the EKF.

In step 240, the processor 120 performs several checks for the current epoch, to ensure that the measurements obtained or calculated in the preceding steps are able to accurately characterise the current dynamics of the vehicle. If any of the criteria is not met in the current epoch, spoofing detection is skipped for the epoch, so that only valid data is used when detecting instances of spoofing. Thus, if a check is failed, the processor waits for a new epoch to begin, with updated inertial and GNSS measurements, before attempting to detect spoofing again. The series of checks may be performed by the spoofing detection block 190, or other blocks in FIG. 1. The checks are illustrated in detail in FIG. 3.

A sanity check is performed on the GNSS signals at step 241. If too few GNSS signals are received at the GNSS receiver (for example, fewer than four signals), or if the signals are of a poor quality (for example, the signals have a low carrier-to-noise (C/N) ratio), the current epoch is skipped (step 245).

The distribution of the SVs transmitting the GNSS signals is monitored at step 242. If the set of visible SVs transmitting GNSS signals to the GNSS receiver is not well distributed geometrically, the positioning accuracy is likely to be weak. This is because, when SVs are close together in the sky, they have poor geometric dilution of precision (GDOP), meaning that there is greater uncertainty about the accuracy of the calculated position. When the visible SVs are spaced further apart in the sky, GDOP decreases, leading to greater confidence in the calculated position. Therefore, if it is determined in step 242 that the SVs have too narrow a distribution, the method proceeds to step 245 and the current epoch is skipped. The checks of step 241 and step 242 may be performed by the LS estimator 180.

It is advantageous to check whether the attitude estimate obtained in step 220 is valid. As the attitude estimate is provided by the navigation filter (EKF 170), the validity of the estimate can be determined by checking whether all the parameters of the navigation solution have been estimated by the navigation filter to a certain degree of accuracy. For example, if an estimated accuracy provided by the EKF (such as an uncertainty of the attitude estimate) is below a threshold value, then the attitude estimate obtained in step 220 is considered to be valid. This is done in step 243. If the accuracy requirement is not satisfied for any one of the parameters of the navigation solution, then the navigation solution is not properly defined, and so the current epoch is skipped (step 245).

A further check is made at step 244, to avoid false detection of a spoofing attack, by monitoring the velocity estimate calculated in step 230. It may be difficult to accurately determine the direction in which the vehicle is travelling at low speeds. If the vehicle is travelling at a low absolute speed, uncertainty from the GNSS measurements may mask the actual movement of the vehicle. To avoid mischaracterising the dynamics of the vehicle, a minimum threshold is applied to the velocity estimate; above this threshold, it is assumed that the movement of the vehicle can be accurately detected. If the velocity estimate is below the minimum threshold (in the current example, 1 m/s), the current epoch is skipped (step 245).

Figure 3:
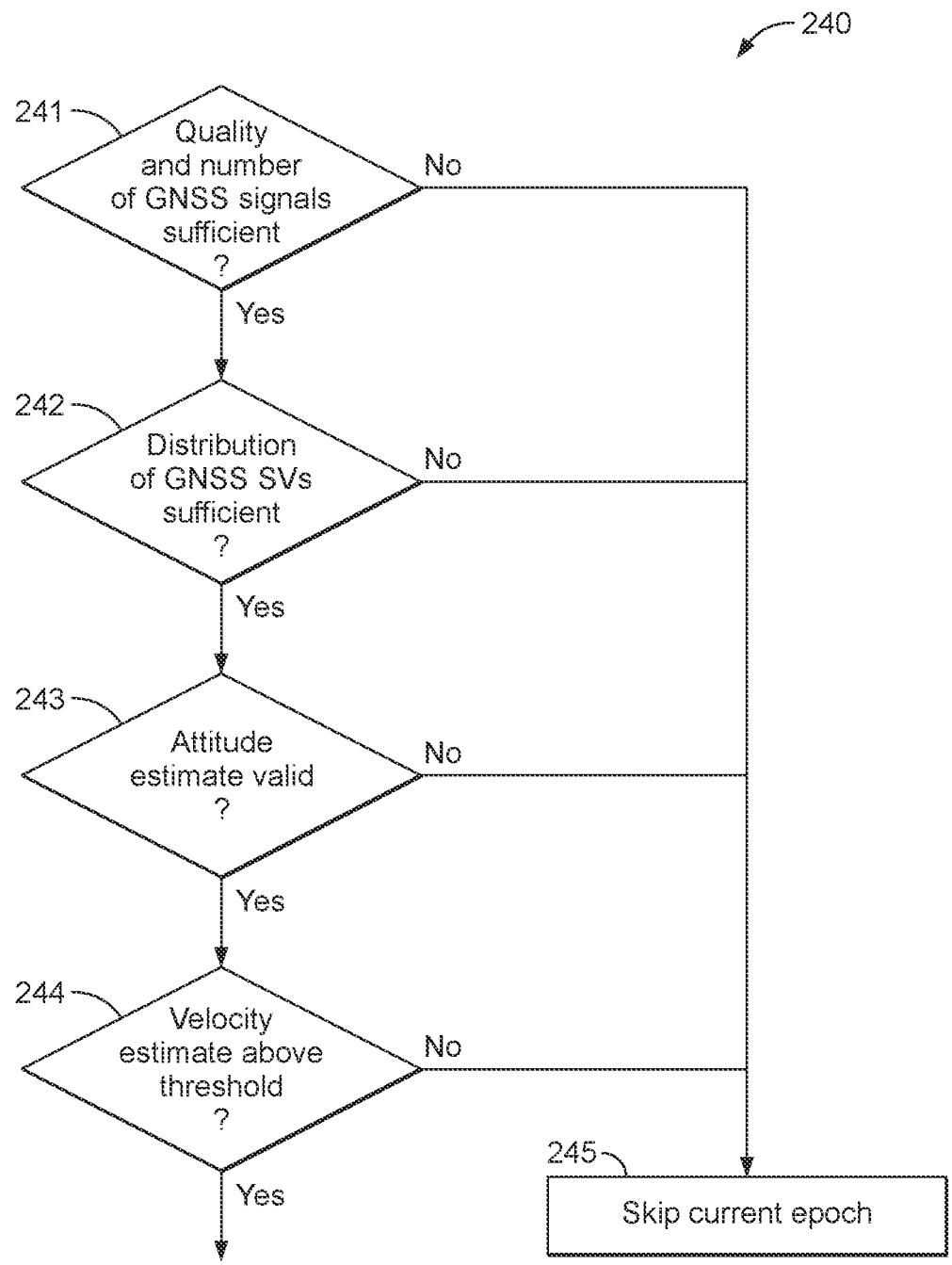
FIG. 3 is a flowchart illustrating criteria for spoofing detection in an epoch, according to an example.

If all of the checks 241, 242, 243, 244 in FIG. 3 (step 240 of FIG. 2) have been passed, the system can be relatively confident that the obtained and calculated measurements can be used to detect instances of spoofing, with a low risk of false positive spoofing alerts. The system then moves on to step 250. On the other hand, if any of the checks is failed, the current epoch is skipped (step 245 in FIG. 3) and the method proceeds from step 240 to step 205, ready for the next epoch.

The velocity estimate obtained in step 230 is a measurement that describes the velocity of the vehicle in the navigation frame. In step 250, the velocity estimate obtained in step 230 is projected from the navigation frame to the body frame of the vehicle. This projection into the body frame takes place in the spoofing detection block 190. The projection of the velocity estimate between the two frames of reference relies on the attitude estimate obtained in step 220 from the EKF 170. The attitude describes the 3-D orientation of the vehicle relative to the navigation frame. The attitude can be represented by a rotation matrix which describes a rotation from the navigation frame to the body frame of the vehicle. The projection between the two frames of reference is described using the following equation:

$$v^b = C_n^b v^n, \quad (1)$$

where $v^b$ is the velocity estimate in the body frame (also referred to herein as the 'projected velocity estimate'), $C_n^b$ is the rotation matrix from the navigation frame to the body frame, and $v^n$ is the velocity estimate in the navigation frame (calculated in step 230). The velocity estimate $v^n$ in the navigation frame has components in three orthogonal directions (North-East-Down, in the present example). In general, the velocity estimate $v^b$ in the body frame may also have components in three orthogonal directions:

$$v^b = \begin{pmatrix} v_{long} \\ v_{lat} \\ v_{vert} \end{pmatrix}, \quad (2)$$

where $v_{long}$, $v_{lat}$, and $v_{vert}$ are the longitudinal (forward), lateral (sideways), and vertical components of the projected velocity estimate, respectively (with the convention Front-Right-Down, in the present example).

Figure 4A:
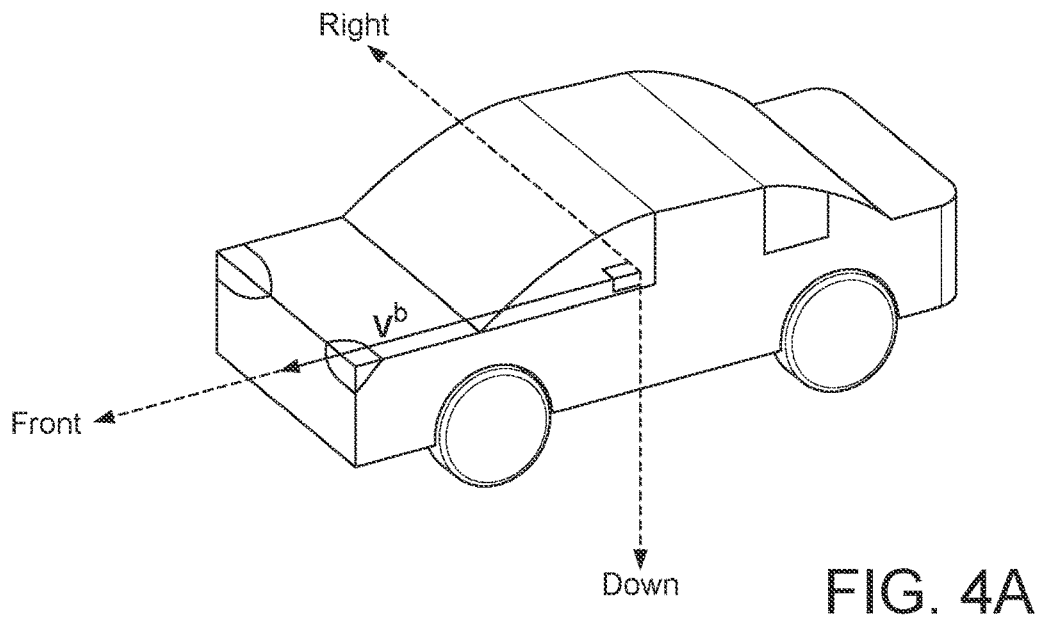
FIG. 4A and FIG. 4B are vector diagrams illustrating a vehicle in two cases.
Figure 4B:
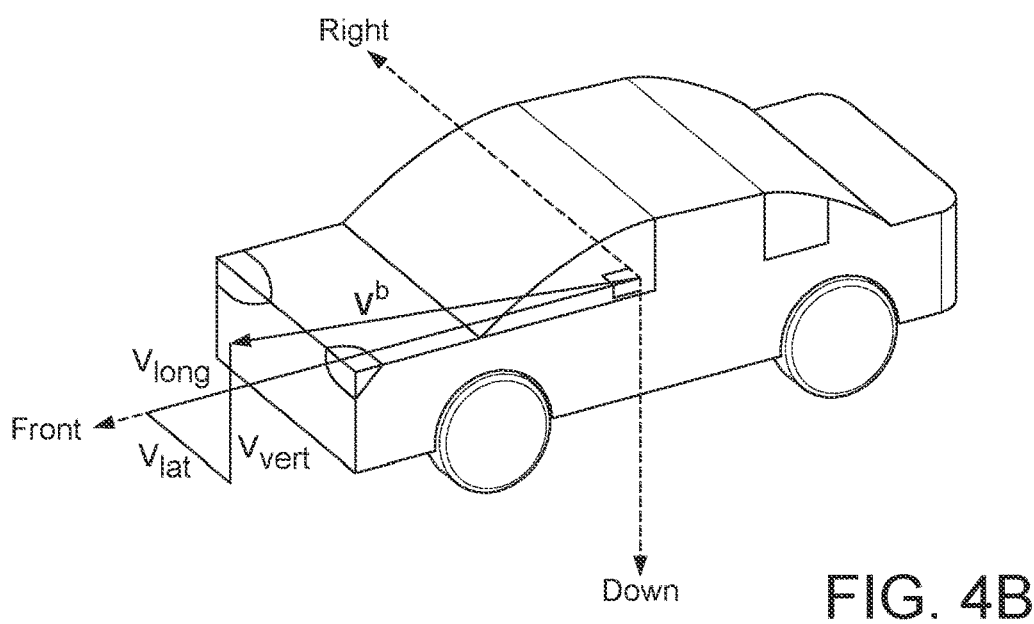

By projecting the velocity estimate to the body frame, non-holonomic constraints can be applied to the system, to act as a reference to determine whether the GNSS receiver module is being subjected to a spoofing attack. FIG. 4A and FIG. 4B illustrate how the system is constrained in the body frame, emphasising the differences between a vehicle obeying non-holonomic constraints (see FIG. 4A) and a vehicle that deviates from the non-holonomic constraints, which suggests that the vehicle may be subjected to a spoofing attack (see FIG. 4B).

It is assumed that the vehicle does not drift (that is, move sideways in the body frame) or fly (that is, move vertically in the body frame). Under these (ideal) assumptions, the only component of $v^b$ that is expected to be non-zero is the component along the "Front" axis ($v_{long}$). In other words, as it is assumed that the vehicle does not drift or fly, the ideally expected values of components of $v^b$ along the "Right" and "Down" axes ($v_{lat}$ and $v_{vert}$, respectively) are zero. In practice, the vertical and lateral components of the velocity in the body frame will not be exactly zero—for example, because of movement caused by the softness of the tires or the car suspension. Nevertheless, these components can still be expected to be close to zero. When the vehicle obeys the non-holonomic constraints, as illustrated in FIG. 4A, the longitudinal direction of the vehicle is very closely aligned with the projected velocity estimate.

On the other hand, FIG. 4B illustrates a vehicle that deviates from the expected values. In this case, the vehicle has non-zero lateral and vertical projected velocity estimate components $v_{lat}$ and $v_{vert}$, respectively, as well as a non-zero longitudinal projected velocity estimate component, $v_{long}$. The vehicle thus has a projected velocity estimate, $v^b$, pointing in a different direction to the longitudinal direction of the vehicle. Assuming that the non-holonomic constraints hold (that is, assuming that the vehicle is indeed not jumping or sliding sideways), this result suggests that the vehicle is being subjected to a spoofing attack. In this way, it can be seen that non-zero lateral and/or vertical components of the projected velocity estimate act as an indicator for spoofing attacks. Therefore, the lateral and vertical components of the projected velocity estimate can be analysed, to assess whether they deviate from the expected case illustrated in FIG. 4A. In the present example, this can be achieved using measurements generated solely by components on board the GNSS receiver module 100, meaning that there is less dependence on vehicle-integrated sensors (such as those that monitor steering inputs and wheel rotation) to determine spoofing attacks.

In step 250 in FIG. 2, when projecting the velocity estimate into the body frame, the processor 120 may take into account the position of the GNSS antenna 105 on the vehicle. The position of the GNSS antenna has a minimal effect for small vehicles, such as cars. However, for longer vehicles such as buses or lorries, the GNSS antenna position may have a greater effect. For example, in a long vehicle over 10 m long, the GNSS antenna may be located at the front of the vehicle, whilst the IMU 130 could be situated towards the rear of the vehicle (or vice versa). As the attitude estimate is based on inertial measurements, and the IMU is located in a significantly different position to the GNSS antenna, there may be a systematic discrepancy in the velocity estimate, depending on the direction and velocity of the vehicle, between the velocity at the antenna and the velocity at the IMU. Therefore, to correct such velocity estimate inconsistencies, the distance between the antenna and the IMU, 'lever arm', is compensated for in step 255. Lever arm compensation is performed when projecting 250 the velocity estimate to the body frame.

Figure 5:
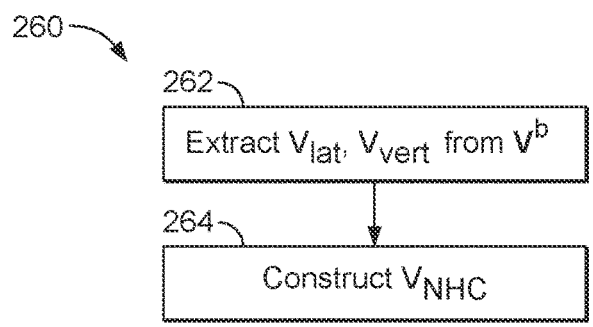
FIG. 5 is a flowchart illustrating a method for deriving a detection parameter.

In step 260, the processor 120 derives a detection parameter from the projected velocity estimate calculated in step 250. (This step 260 is also implemented as part of the spoofing detection block 190.) The detection parameter is a variable derived to indicate when the GNSS receiver module 100 is subjected to a spoofing attack. FIG. 5 illustrates how the detection parameter is derived. In step 262, the lateral and vertical components of the projected velocity estimate, $v_{lat}$ and $v_{vert}$, are extracted from the projected velocity estimate, $v^b$. Then, in step 264, an artificial non-holonomic constraint (NHC) speed is constructed using the extracted projected velocity estimate components. In this example, the artificial NHC speed is constructed using the absolute values of both extracted components of the projected velocity estimate in a weighted sum, $$v_{NHC} = r \cdot |v_{lat}| + (1-r) \cdot |v_{vert}|, \quad (3)$$

where $v_{NHC}$ is the artificial NHC speed and r is a configurable weighting parameter, with r ∈ [0,1]. For example, the configurable weighting parameter may be set as r=⅔, as a large vertical component of the projected velocity vector may be more likely to be a sign of spoofing than a large horizontal component. In this example, the weights applied to each extracted component of the projected velocity estimate are dependent on each other. Such a dependency between the weights is suitable for constructing the artificial NHC speed, as both extracted components of the projected velocity estimate originate from the same GNSS measurements. As a result of the restrictions on the configurable weighting parameter, and the absolute value being taken of the extracted components of the projected velocity estimate, $v_{NHC}$ is always non-negative. It is this configurable artificial NHC speed, encapsulating the physical constraints of the vehicle platform, that is used as a pseudo-sensor to detect whether the vehicle is being subjected to a spoofing attack or not. Instead of comparing GNSS measurements to vehicle-integrated sensor values, the physical constraints of the vehicle cause the output of the pseudo-sensor to be zero (within some margin of error), unless there are spoofed signals. Hence, $v_{NHC}$ is defined as the detection parameter in this example.

Deviations in the detection parameter value can occur for reasons other than spoofing—for example, because of noise in the inertial measurements, the measurements provided by the GNSS receiver, the obtained attitude estimate, or the calculated velocity estimate. The present inventors have recognised that these innocent variations in the detection parameter may vary in magnitude in different circumstances. Therefore, it is desirable to use a detection threshold that adapts dynamically to the prevailing conditions. Accordingly, in step 360 of FIG. 2, the processor 120 derives a detection threshold, designed to account for innocent variations in the detection parameter value, whilst still allowing variations in the parameter that are caused by spoofing to be detected. (This step is also implemented as part of the spoofing detection block 190 of FIG. 1.)

Figure 6:
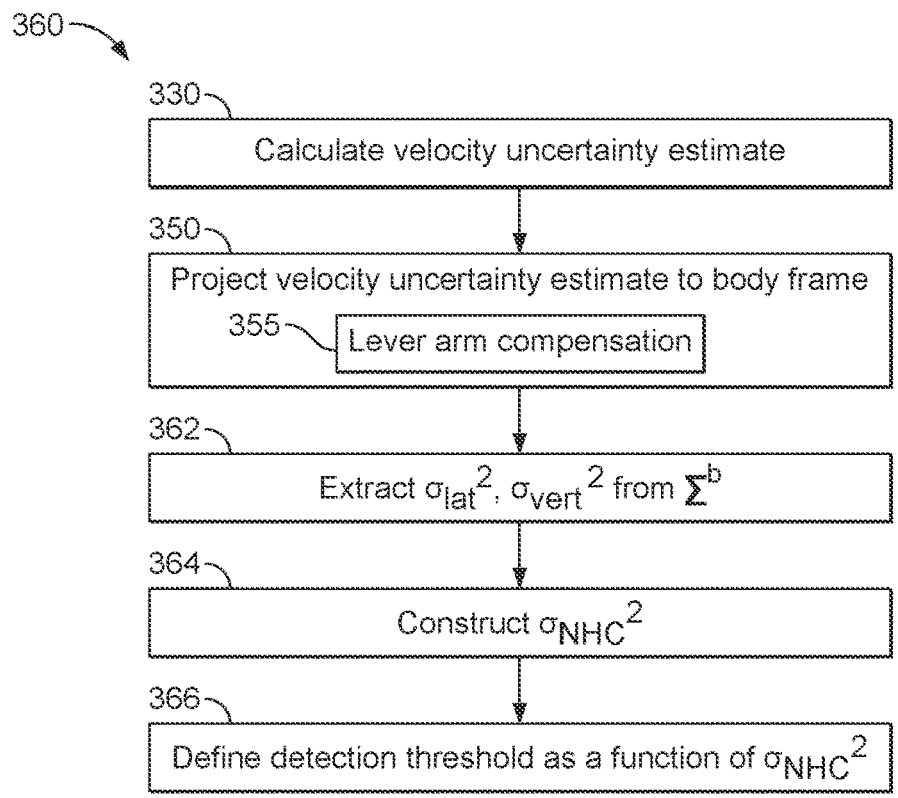
FIG. 6 is a flowchart illustrating a method for deriving a detection threshold.

FIG. 6 illustrates the derivation of a dynamic detection threshold—that is, a detection threshold that adapts to the conditions and information available, changing its value based on calculable uncertainties. Measurements provided by the GNSS receiver are used to calculate a velocity uncertainty estimate of the vehicle in the navigation frame, in step 330. The velocity uncertainty estimate is calculated using the LS estimator 180. The velocity estimate and velocity uncertainty estimate may be calculated simultaneously by the LS estimator 180.

The velocity uncertainty estimate calculated in step 330 describes the uncertainty of the vehicle's velocity in the navigation frame. In order to describe uncertainty in the detection parameter, the velocity uncertainty estimate is projected into the body frame in step 350. The projection of the velocity uncertainty estimate between the two frames of reference relies on the attitude estimate obtained in step 220 from the EKF 170. The method for projecting the velocity uncertainty estimate into the body frame is analogous to the method for projecting the velocity estimate in step 250. The projection of the velocity uncertainty estimate from the navigation frame to the body frame can be described using the following equation:

$$\Sigma^b = C_n^b \Sigma^n C_b^n, \quad (4)$$

where $\Sigma^b$ is the velocity uncertainty estimate matrix in the body frame, $\Sigma^n$ is the velocity uncertainty estimate matrix in the navigation frame, and $C_b^n$ is the rotation matrix from the body frame to the navigation frame (in other words, the inverse of $C_n^b$). Like the projected velocity estimate, the projected velocity uncertainty estimate also has components in three orthogonal directions:

$$\Sigma^b = \begin{bmatrix} \sigma_{long}^2 & \cdots & \cdots \\ \cdots & \sigma_{lat}^2 & \cdots \\ \cdots & \cdots & \sigma_{vert}^2 \end{bmatrix}, \quad (5)$$

where $\sigma_{long}^2$, $\sigma_{lat}^2$, and $\sigma_{vert}^2$ are the longitudinal, lateral, and vertical components of the projected velocity uncertainty estimate, respectively. Uncertainty arising from the attitude estimate is not taken into account here, as the attitude estimate is deemed to be valid in step 243.

Where necessary—for example, for long vehicles—the method of deriving the detection threshold also compensates for the position of the antenna 105 on the vehicle, in step 355. This lever arm compensation can be performed in the same manner as in step 255, described above. Error/uncertainty in the lever arm compensation is neglected, in the present example.

The remaining steps for the derivation of the detection threshold mirror the process for deriving the detection parameter, in step 260. Following on from Equation (5), the lateral and vertical components of the projected velocity uncertainty estimate, $\sigma_{lat}^2$ and $\sigma_{vert}^2$, are extracted from the matrix $\Sigma^b$ in step 362.

As the detection parameter in the present example is based on the lateral and vertical projected velocity estimate components, a detection threshold based on the uncertainty of these projected velocity estimate components is constructed. Choosing the detection threshold to match the detection parameter allows the uncertainty of the detection parameter to be analysed in a consistent, principled way. Similar to the to construction of the artificial NHC speed in step 264, in step 364 a NHC speed uncertainty is constructed. The formulation uses both extracted components of the projected velocity uncertainty estimate in a weighted sum:

$$\sigma_{NHC}^2 = r^2 \cdot \sigma_{lat}^2 + (1-r)^2 \cdot \sigma_{ver}^2, \quad (6)$$

where $\sigma_{NHC}^2$ is the NHC speed uncertainty, and r is the same configurable weighting parameter that was used in Equation (3). While the configurable artificial NHC speed encapsulates the extent to which the physical constraints of the vehicle platform are breached, the configurable NHC speed uncertainty verifies whether such a breach is a result of spoofing, or is more likely to result from an innocent, calculable uncertainty.

In step 366, the detection threshold is defined as a function of the constructed NHC speed uncertainty, $\sigma_{NHC}^2$. The detection threshold, $\varepsilon$, is defined to take the form, $$\varepsilon := f \cdot \sqrt{\sigma_{NHC}^2}, \quad (7)$$

where f is a configurable sensitivity factor. Therefore, when the constructed NHC speed uncertainty increases, the detection threshold increases, and when the constructed NHC speed uncertainty decreases, the detection threshold decreases, to account for the expected uncertainty. Thus, the detection threshold varies depending on the uncertainty of the detection parameter. This reduces the chances of false positive spoofing detections (false alarms) occurring when the uncertainty in the projected velocity measurement is high, as well as the chances of false negative spoofing detections (missed detections) when the uncertainty in the projected velocity measurement is low. In the present example, a sensitivity factor of f=3 (corresponding to a conservative three sigma threshold) was found to produce good results.

Returning to the flowchart of FIG. 2, in step 280 the processor compares the derived detection parameter and derived detection threshold. This step 280 is implemented by the processor as part of the spoofing detection block 190. If the detection parameter exceeds the detection threshold, a potential instance of spoofing is detected. If the detection parameter is below the detection threshold, a potential instance of spoofing is not detected in the current epoch.

Figure 7:
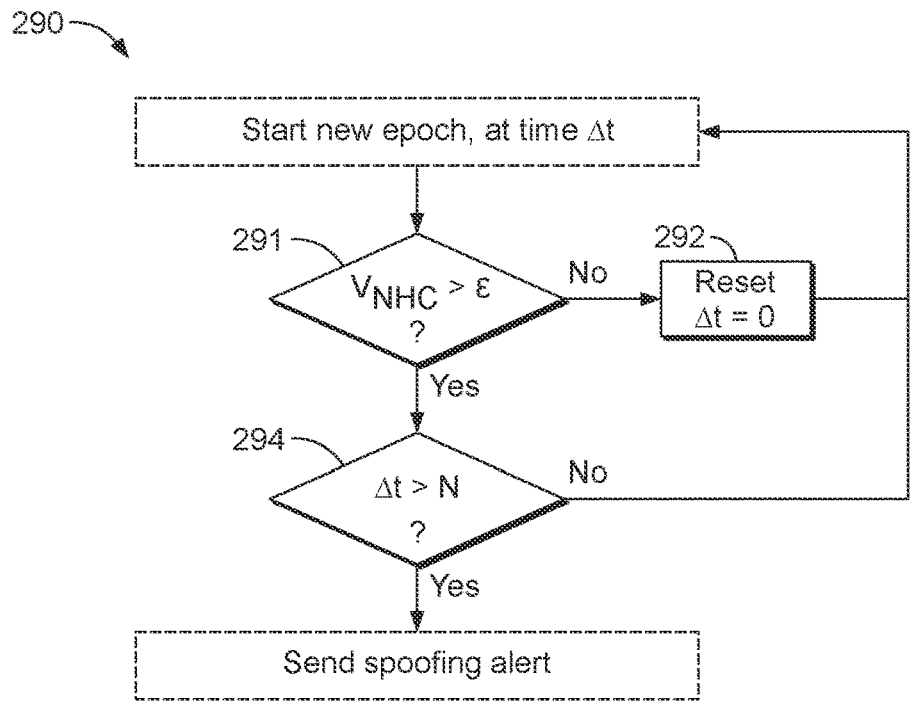
FIG. 7 is a flowchart illustrating a method for generating a spoofing alert.

In some embodiments, a single instance of the detection parameter exceeding the detection threshold in an epoch could trigger a spoofing alert. However, in this example, for an instance of GNSS spoofing to be detected, the detection parameter and detection threshold must pass a set of criteria 290, before a spoofing alert is generated, at step 295, by the processor 120. FIG. 7 shows the set of criteria that must be met before a spoofing alert can be sent. At the start of the first epoch, a timer begins to counting the time in seconds from $\Delta t=0$. Once the timer starts, the GNSS spoofing detection method 200 is run, in order to calculate the detection parameter and the detection threshold for the epoch. At step 291, it is determined whether the detection parameter is above the detection threshold. If the detection parameter ($v_{NHC}$) is below the detection threshold ($\varepsilon$), the timer resets to $\Delta t=0$ at step 292, and a new epoch begins. If the detection parameter does exceed the detection threshold, a potential instance of spoofing is detected in the epoch. At step 294, the time is assessed to check if it meets a criterion to send a spoofing alert. The criterion requires that the detection parameter exceeds the detection threshold for a predetermined length of time, N seconds, over multiple consecutive epochs. As a non-limiting example, N is set equal to 10. If the criterion in step 294 is met (in other words, if $\Delta t>10$), then an instance of GNSS spoofing has been detected. If the detection parameter has not exceeded the detection threshold for greater than 10 s, then the detection parameter and detection threshold are calculated for the next epoch, with the timer continuing to count the time without being reset to $\Delta t=0$.

In step 295 of FIG. 2, if the criteria of step 290 are met, then spoofing is detected and a spoofing alert is generated by the processor 120. The spoofing alert may be used in a variety of different ways, depending on the application. For example, if the GNSS receiver module 100 is part of a navigation system, the navigation system may warn the driver of the car that the GNSS positioning information is unreliable. The navigation system may suspend display of the vehicle's position on an electronic map, for example. If the GNSS receiver module 100 is part of an autonomous driving control system, then the system may force the driver to take manual control of the vehicle, because of the unreliability of the GNSS positioning information. If the GNSS receiver module is incorporated in a tracking device or toll tag, the device or toll tag may record the fact that an instance of spoofing has been detected and/or may send a warning message to a service provider, notifying the service provider that tracking/toll information is unreliable.

Figure 8A:
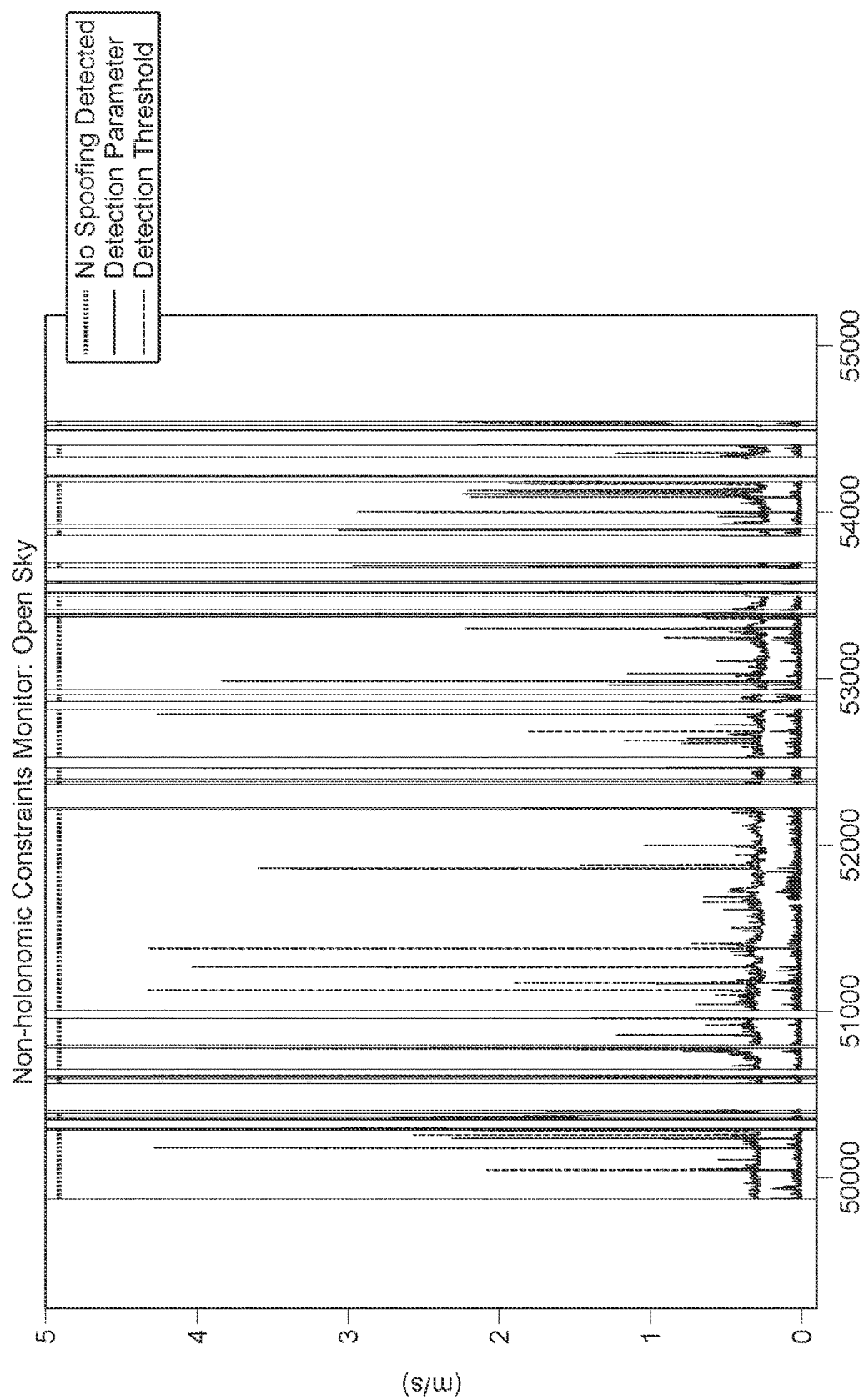
FIG. 8A and FIG. 8B show a plot of a detection parameter and detection threshold in two cases.
Figure 8B:
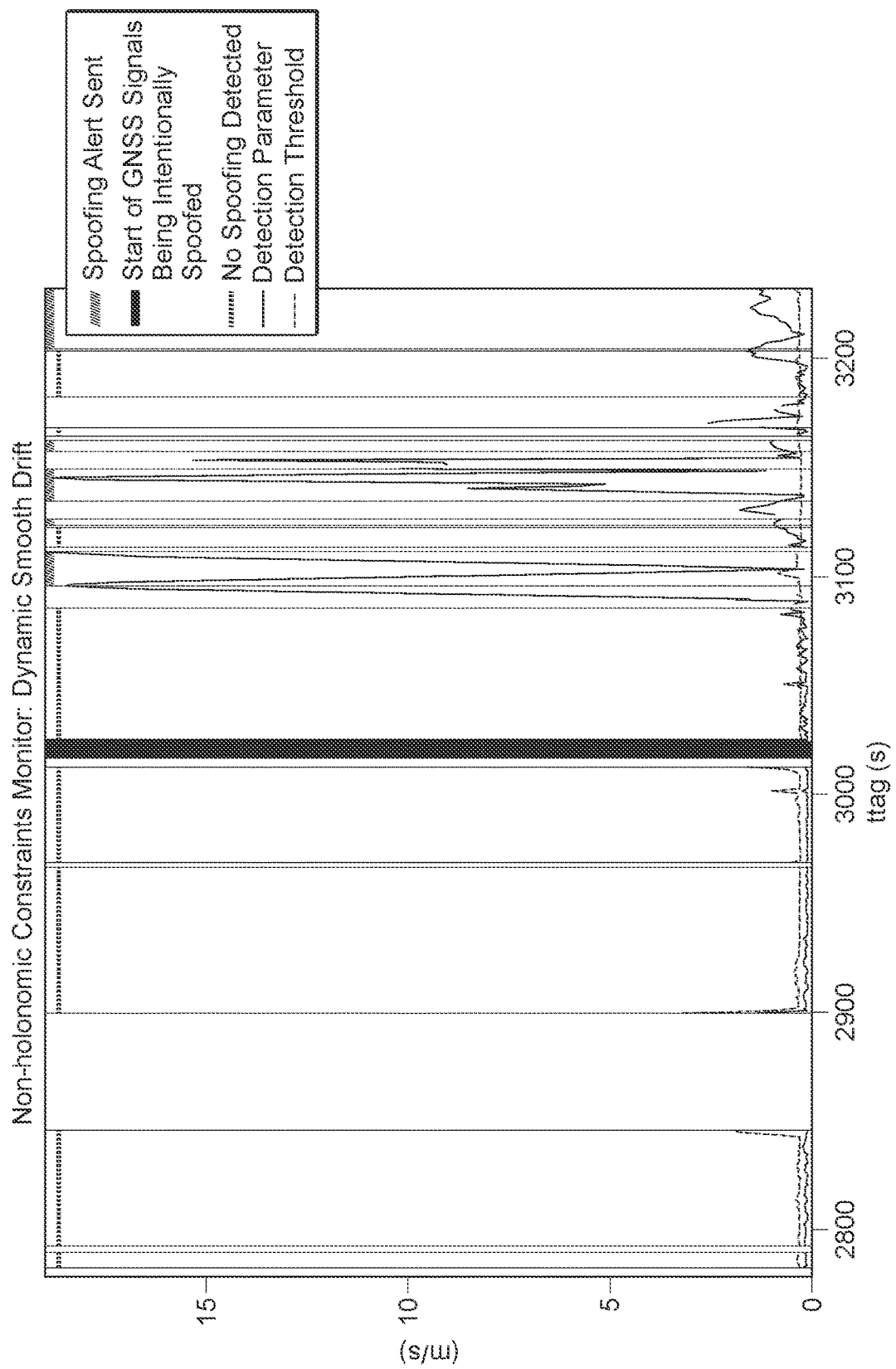

FIG. 8A and FIG. 8B display test results illustrating the GNSS spoofing detection method in operation. The graph in FIG. 8A shows the detection parameter for a vehicle not subjected to a spoofing attack. Over a long time period, the detection parameter (represented by the solid line) remains below the detection threshold (represented by the dashed line). Although there are spikes in the detection parameter value (notably around 53,000 s), there are corresponding spikes in the detection threshold, indicating higher uncertainty about the detection parameter value. Therefore, the implementation of a dynamic threshold has successfully avoided a false positive detection of spoofing. Moreover, there are occasional spikes in the detection parameter that cause it to exceed the detection threshold (a spike around 53,800 s, for example), indicating potential instances of spoofing. However, these spikes in the detection parameter are short-lived. The detection parameter returns to a value closer to 0 m/s, below the detection threshold. Therefore, the set of criteria in step 290, illustrated in FIG. 7, are successful in avoiding a false positive detection of spoofing. In particular, the requirement for the detection parameter to exceed the detection threshold for longer than a predetermined time interval avoids a false positive detection. The epochs marked at the top of the graph with a dotted line denote times where no spoofing instances have been detected, as the detection parameter remains below the detection threshold ($v_{NHC}<\varepsilon$). Epochs that are blank on the graph (without a detection parameter or detection threshold present) represent times where the GNSS receiver module had insufficient information to form the detection parameter and detection threshold, as a result of the set of checks implemented at step 240 of the spoofing detection method.

The graph in FIG. 8B shows the detection parameter for a vehicle subjected to a spoofing attack. The graph initially appears the same as the previous graph, with the detection parameter staying below the detection threshold for the first 3000 s. These epochs, in which no potential spoofing instance has been detected, are marked at the top of the graph by the dotted line, as in FIG. 8A. At around 3020 s, the spoofing attack starts (as indicated by the solid black vertical line on the graph). At around 3085 s, the detection parameter first exceeds the detection threshold. At this point, a potential spoofing instance has been detected. The detection parameter dramatically deviates from the relatively constant detection threshold for the next 10 seconds. Since the criteria of step 290 have been met (here, N=10), a spoofing alert is generated. Epochs that are blank at the top of the graph (with a detection parameter and detection threshold present) represent times where the GNSS receiver module has detected a potential spoofing instance. In other words, the detection parameter has exceeded the detection threshold in these epochs, but the criterion outlined in step 294 has not been met. The epochs marked at the top of the graph with diagonally-striped lines signify epochs where spoofing instances have been detected, as the final criterion outlined in step 294 has been met, such that the GNSS receiver module generates a spoofing alert. This spoofing alert continues to be generated in each epoch until the detection parameter returns to a value below the detection threshold, or until the count resets due to insufficient measurements or invalid estimates as part of the set of checks 240.

It should be noted that the above-mentioned embodiments illustrate rather than limit the invention, and that those skilled in the art will be able to design many alternative embodiments without departing from the scope of the appended claims.

In an alternative example, the IMU 130 may comprise a different configuration of inertial sensors. For example, the IMU may consist of a multi-axis accelerometer and a multi-axis gyroscope, instead of multiple single-axis accelerometers and multiple single-axis gyroscopes. In particular, the IMU may comprise a single accelerometer triad and a single gyroscope triad. The IMU may also include further sensors, including but not limited to one or more magnetometers and/or one or more barometers.

Alternatively, sensors could be external to the GNSS receiver module. Such sensors could include one or more sensors in a similar configuration to the sensors described integrated into the GNSS receiver module. Alternatively, in some embodiments, the inertial sensors of the IMU may be substituted with another source of inertial measurements from which the attitude estimate can be obtained. For example, it is possible to use an array of GNSS antennas, at widely separated locations on the vehicle, to derive information about the attitude of the vehicle by comparing the GNSS signals received at the different antennas.

For the example illustrated in FIG. 1, the navigation filter (in this case, the EKF 170) uses raw GNSS measurements obtained from the GNSS receiver (in step 210), and inertial measurements (obtained in step 215), to generate position, velocity, and attitude estimates. This approach corresponds to a tightly-coupled Kalman filter. However, the scope of the present disclosure is not limited to such an approach. A GNSS receiver module could use a loosely-coupled Kalman filter, wherein the GNSS measurements are processed to produce a position and velocity solution, before inputting this solution to the navigation filter. For example, the navigation filter may use a navigation solution from an additional GNSS filter, instead of using the raw GNSS measurements obtained from the GNSS receiver.

The spoofing detection method is not limited to the set of checks described in the example of FIG. 3. For example, a smaller number of checks may be made. These checks may comprise a selected subset of the checks shown in FIG. 3. Similarly, the number of checks may exceed the number of checks shown in FIG. 3, to further ensure the spoofing detection method only proceeds for the current epoch if conditions are appropriate. For example, further checks may include selecting only GNSS signals that originate from a specific GNSS constellation, or checking that correction data is received to compensate for ionospheric and tropospheric propagation delay of the GNSS signals.

In an alternative example, separate LS estimators may be used—one for calculating the velocity estimate and another for calculating the velocity uncertainty estimate. Alternatively, a separate Kalman filter could be used to estimate both the velocity and the velocity uncertainty. In still other examples, other types of filter may replace the EKF or the LS estimator. As a non-limiting example, the other types of filter may include particle filters.

The derivation of the detection parameter in step 260 is not limited to the set of steps outlined in FIG. 5. For example, the artificial NHC speed may be constructed using only one of the components of the projected velocity estimate, rather than a weighted sum of two of the components. In particular, the artificial NHC speed may be proportional or equal to a lateral velocity estimate component. Similarly, the artificial NHC speed may be proportional or equal to vertical velocity estimate component. In other examples in which a weighted sum is used, the weights may be independent of one another. For example, the artificial NHC speed may be constructed using the absolute values of both extracted components of the projected velocity estimate in a weighted sum, $$v_{NHC} = r \cdot |v_{lat}| + s \cdot |v_{vert}|, \quad (8)$$

where $v_{NHC}$ is the artificial NHC speed, and r and s are two independent configurable weighting parameters, with $r \in [0,1]$, and $s \in [0,1]$. The range of the independent configurable weighting parameters could be broader than [0,1]. For example if r, s>0, the detection parameter $v_{NHC}$ would be non-negative, and would remain a suitable indicator for detecting spoofing instances.

In these other examples, the independent configurable weighting parameters used to construct the artificial NHC speed are used to construct the NHC speed uncertainty. For the example described by Equation (8), the formulation uses both extracted components of the projected velocity uncertainty estimate in a weighted sum:

$$\sigma_{NHC}^2 = r^2 \cdot \sigma_{lat}^2 + s^2 \cdot \sigma_{ver}^2, \quad (9)$$

where $\sigma_{NHC}^2$ is the NHC speed uncertainty, and r and s are the same configurable weighting parameters that are used in Equation (8).

The detection threshold could be fixed, so that the detection threshold does not change value over multiple epochs. Such a detection threshold might not be based on measurements provided by the GNSS receiver. For example, the detection threshold may be based on an arbitrary constant value. However, in other cases, the fixed detection threshold may be based on measurements provided by the GNSS receiver. For example, a detection threshold may be set based on the initial projected velocity uncertainty estimate from the first epoch, or may be set as a constant function of the constructed NHC speed uncertainty from the first epoch. In an alternative example, the detection threshold may be dynamic, but might not depend on a function of the constructed NHC speed uncertainty. For example, the detection threshold may be directly set as the constructed NHC speed uncertainty. For the detection threshold described in FIG. 6, the configurable sensitivity factor f may be set to any suitable value—f does not have to equal 3.

Figure 9:
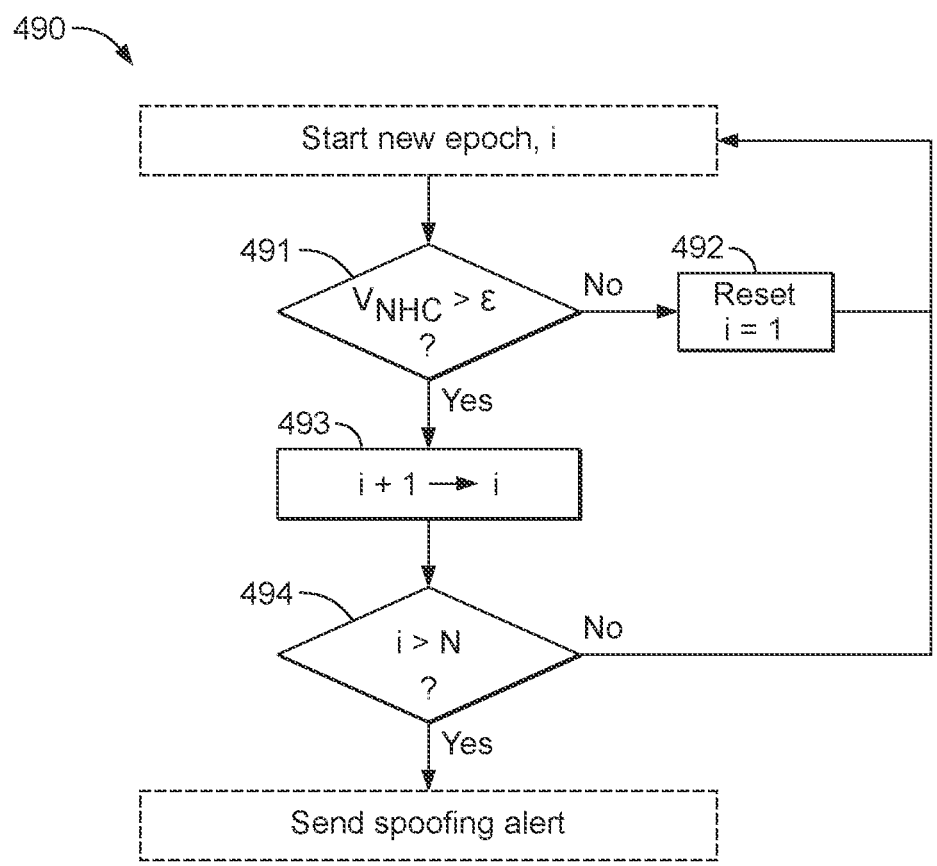
FIG. 9 is a flowchart illustrating an alternative method for determining whether a spoofing alert should be generated by a GNSS receiver module.

As a variation to the criteria shown in FIG. 7, the minimum time interval for triggering detection of spoofing can be measured in other ways or in other units. For instance, spoofing may be detected and a spoofing alert may be triggered if the threshold is exceeded for a predetermined number of consecutive epochs. A set of criteria 490 for a spoofing alert based on such a requirement is illustrated in FIG. 9.

At the start of the first epoch, a counter is initialized to start at i=1. For the measurements and calculations obtained in the first epoch, designated by i=1, the GNSS spoofing detection method 200 is run, eventually comparing the detection parameter with the detection threshold for this first epoch in step 491. If the detection parameter is below the detection threshold, it is determined that the vehicle is not currently being subjected to a spoofing attack. If the detection parameter exceeds the detection threshold, a potential instance of spoofing is detected in the epoch. In the case that the detection parameter is below the detection threshold, the count i is reset back to its initial value, i=1, at step 492.

In an alternative example, instead of the count being reset back to the initial value at step 492, the count could be decremented. For example, if the count is i=4, and in this current epoch the detection parameter is below the detection threshold, then the count may be decremented to i=3, before starting a new epoch. Similarly, instead of the time being reset to zero at step 292 in FIG. 7, the time could be decremented by a fixed amount of time. The count or time may be forced to be greater than or equal to zero. That is, the decrementing may cease once the count or time reaches zero.

In the case that the detection parameter exceeds the detection threshold, the count increases by a value of one in step 493. Each time the count is incremented, the count is assessed to check if it meets the criteria to send a spoofing alert. If the detection parameter has exceeded the detection threshold for N consecutive epochs (i>N) in step 494, then spoofing is detected and a spoofing alert is generated. If the detection parameter has not yet exceeded the detection threshold for N consecutive epochs, then the same measurements and calculations are made in the next epoch.

For a GNSS receiver module that receives GNSS signals regularly, the two sets of criteria for detecting spoofing (steps 290 and 490) are analogous. For example, if GNSS signals are received with a frequency of 1 Hz, and a spoofing alert is only sent after 10 s of consecutive epochs detecting spoofing, then ten consecutive epochs must detect spoofing, such that N=10 in FIG. 7. It should be noted that the frequency of updating measurements should not be set too high (in other words, the epoch lengths should not be too small). Otherwise, the change in the inertial/GNSS measurements might not be sufficient to detect spoofing. Typically, the shorter the epoch length, the larger the number of consecutive epochs that should be considered in order to detect spoofing—that is, the larger the appropriate value of N.

In the example of FIG. 1, the processor 120 on board the GNSS receiver module 100 carried out all the steps of the spoofing detection method 200. However, in other implementations, the processing may be carried out elsewhere, or may be distributed among multiple processors, in the same or different locations. For instance, a GNSS measurement engine may be used to generate GNSS measurements, with a navigation engine separately integrated into the vehicle host. Spoofing detection could be performed either by the GNSS measurement engine or the navigation engine, or the processing may be shared between these two components. In another example, all of the GNSS measurements could be sent to a cloud computer capable of calculating the navigation solution, before the solution is sent back to the vehicle, instead of using an EKF or LS estimator. In such an example, the spoofing detection method could be implemented by the cloud computer.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples. Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method comprising:

receiving, by a global navigation satellite system (GNSS) receiver, GNSS signals that are transmitted from GNSS satellites;

generating, by the GNSS receiver, GNSS measurement data based at least on the GNSS signals;

obtaining, by one or more processors in a vehicle, (i) sensor measurement data that is generated by one or more sensors in the vehicle, and (ii) the GNSS measurement data;

obtaining, by the one or more processors in the vehicle, an attitude estimate of the vehicle, the attitude estimate of the vehicle (i) indicating an orientation of the vehicle relative to a navigation frame of reference, and (ii) being based at least on the sensor measurement data that is generated by the one or more sensors in the vehicle;

calculating, by the one or more processors in the vehicle, a velocity estimate of the vehicle and a velocity uncertainty estimate, the velocity estimate of the vehicle and the velocity uncertainty estimate being in a navigation frame of reference that is different than a vehicle body frame of reference, and the velocity estimate of the vehicle and the velocity uncertainty estimate being based at least on the GNSS measurement data from the GNSS receiver;

projecting, by the one or more processors in the vehicle, the velocity estimate of the vehicle and the velocity uncertainty estimate from the navigation frame of reference to the vehicle body frame of reference, using the attitude estimate;

deriving, by the one or more processors in the vehicle, a detection parameter from the projected velocity estimate in the vehicle body frame of reference;

comparing, by the one or more processors in the vehicle, the detection parameter with a detection threshold; and generating, by the one or more processors in a vehicle, an alert that indicates that GNSS spoofing has been detected based at least on comparing the detection parameter with the detection threshold.

2. The method of claim 1, wherein the detection parameter is based on at least one of:
   a lateral component of the projected velocity estimate; or
   a vertical component of the projected velocity estimate.

3. The method of claim 1, wherein the detection threshold is based on at least one of:
   a lateral component of the projected velocity uncertainty estimate; or
   a vertical component of the projected velocity uncertainty estimate.

4. The method of claim 1, wherein the attitude estimate is based at least in part on inertial measurements.

5. The method of claim 1, wherein the attitude estimate is provided by a navigation filter.

6. The method of claim 5, wherein the navigation filter generates a position estimate, a velocity estimate, and the attitude estimate, based at least in part on (i) the GNSS measurement data generated by the GNSS receiver and (ii) inertial measurements.

7. The method of claim 1, further comprising
   performing one or more checks in each epoch, and, if any of the checks is failed, skipping the detection of spoofing for that epoch,
   wherein the one or more checks comprise one or more of:
   checking the quality and number of GNSS signals received at the GNSS receiver;
   checking the distribution of GNSS space vehicles transmitting the GNSS signals;
   checking the validity of the attitude estimate; and
   checking that the velocity estimate is above a minimum threshold.

8. The method of claim 1, wherein spoofing is detected if the detection parameter exceeds the detection threshold continuously or continually, for a predetermined period of time.

9. A global navigation satellite system (GNSS) receiver module for a vehicle, comprising:
   a GNSS receiver that is configured to perform operations comprising:
      receiving GNSS signals that are transmitted from GNSS satellites; and
      generating GNSS measurement data based at least on the GNSS signals; and
   one or more processors that are configured to perform operations comprising:
      obtaining (i) sensor measurement data that is generated by one or more sensors in a vehicle, and (ii) the GNSS measurement data;
      obtaining an attitude estimate of the vehicle, the attitude estimate of the vehicle (i) indicating an orientation of the vehicle relative to a navigation frame of reference, and (ii) being based at least on the sensor measurement data that is generated by the one or more sensors in the vehicle;
      calculating a velocity estimate of the vehicle and a velocity uncertainty estimate, the velocity estimate of the vehicle and the velocity uncertainty estimate being in a navigation frame of reference that is different than a vehicle body frame of reference, and the velocity estimate of the vehicle and the velocity uncertainty estimate being based at least on the GNSS measurement data from the GNSS receiver;
      projecting the velocity estimate of the vehicle and the velocity uncertainty estimate from the navigation frame of reference to the vehicle body frame of reference, using the attitude estimate;
      deriving a detection parameter from the projected velocity estimate in the vehicle body frame of reference;
      comparing the detection parameter with a detection threshold; and
      generating an alert that indicates that GNSS spoofing has been detected based at least on comparing the detection parameter with the detection threshold.

10. The GNSS receiver module of claim 9, further comprising an inertial measurement unit, the inertial measurement unit comprising the one or more sensors, wherein the one or more processors are configured to implement a navigation filter, and wherein the attitude estimate is generated by the navigation filter, based at least in part on (i) the GNSS measurement data generated by the GNSS receiver and (ii) inertial measurements.

11. The GNSS receiver module of claim 10, wherein the navigation filter generates a position estimate, the velocity estimate, and the attitude estimate, based at least in part on (i) the GNSS measurement data generated by the GNSS receiver and (ii) inertial measurements.

12. The GNSS receiver module of claim 9, wherein the one or more processors are configured to implement a least squares estimator, wherein the velocity estimate is calculated using the least squares estimator.

13. One or more tangible, non-transitory, computer-readable media storing instructions that, when executed by one or more processors, cause the one or more processors to perform operations comprising:
   generating global navigation satellite system (GNSS) measurement data based at least on GNSS signals that are transmitted from GNSS satellites and that are received by a GNSS receiver;
   obtaining (i) sensor measurement data that is generated by one or more sensors in a vehicle;
   obtaining an attitude estimate of the vehicle, the attitude estimate of the vehicle (i) indicating an orientation of the vehicle relative to a navigation frame of reference, and (ii) being based at least on the sensor measurement data that is generated by the one or more sensors in the vehicle;
   calculating a velocity estimate of the vehicle and a velocity uncertainty estimate, the velocity estimate of the vehicle and the velocity uncertainty estimate being in a navigation frame of reference that is different than the vehicle body frame of reference, and the velocity estimate of the vehicle and the velocity uncertainty estimate being based at least on the GNSS measurement data;
   projecting the velocity estimate of the vehicle and the velocity uncertainty estimate from the navigation frame of reference to the vehicle body frame of reference, using the attitude estimate;
   deriving a detection parameter from the projected velocity estimate in the vehicle body frame of reference;
   comparing the detection parameter with a detection threshold; and
   generating an alert that indicates that GNSS spoofing has been detected based at least on comparing the detection parameter with the detection threshold.

14. The method of claim 1, comprising prompting a driver of the vehicle to take manual control based on the alert.

15. The method of claim 1, comprising notifying a toll provider that toll information associated with the vehicle is unreliable based on the alert.

16. The method of claim 1, comprising suspending display of a position of the vehicle on an electronic map based on the alert.

* * * * *